United States Patent
Van Blokland

(10) Patent No.: US 10,568,332 B2
(45) Date of Patent: Feb. 25, 2020

(54) DOUGH LINE FOR PROCESSING STICKY DOUGH TYPES

(71) Applicant: Radie B.V., BC Culemborg (NL)

(72) Inventor: Johannes Josephus Antonius Van Blokland, BG Laren (NL)

(73) Assignee: Radie B.V. (NL)

( * ) Notice: Subject to any disclaimer, the term of this patent is extended or adjusted under 35 U.S.C. 154(b) by 126 days.

(21) Appl. No.: 15/817,126

(22) Filed: Nov. 17, 2017

(65) Prior Publication Data

US 2018/0132490 A1    May 17, 2018

(30) Foreign Application Priority Data

Nov. 17, 2016 (EP) .................................. 16199277

(51) Int. Cl.
*A21C 3/06*     (2006.01)
*A21C 7/01*     (2006.01)
(Continued)

(52) U.S. Cl.
CPC ............ *A21C 7/01* (2013.01); *A21C 3/06* (2013.01); *A21C 3/10* (2013.01); *A21C 7/04* (2013.01); *A21C 11/006* (2013.01)

(58) Field of Classification Search
CPC .... A21C 3/06; A21C 7/01; A21C 7/04; A21C 11/006
(Continued)

(56) References Cited

U.S. PATENT DOCUMENTS 1,366,266 A * 1/1921 Lauterbur ................. A21C 7/01
                                                    425/320
1,674,229 A * 6/1928 Scruggs .................... A21C 3/06
                                                    425/230
(Continued)

FOREIGN PATENT DOCUMENTS

EP    2236039 A1    10/2010
GB    595544 A      12/1947
(Continued)

OTHER PUBLICATIONS

European Search Report issued in EP patent application No. 16199277.1, dated Feb. 22, 2017.

*Primary Examiner* — James P Mackey
(74) *Attorney, Agent, or Firm* — Katten Muchin Rosenman LLP

(57) ABSTRACT

A dough line, comprising at least one conveyor for transporting elongated dough pieces in a direction of conveyance, a first and a second contact surface extending in the direction of conveyance arranged above the conveyor that curls up a dough piece conveyed underneath into a cylindrical shape, and a moulding unit for moulding the curled up dough piece, compressing the dough piece in an axial direction, wherein the first contact surface is configured for exerting a force onto a leading edge of the dough piece with at least a component in a direction opposite to the direction of conveyance and subsequently curling up the dough piece over a part of its length, and the second contact surface is configured for engaging the dough piece at an outer lateral surface of the part already curled up by the first contact surface substantially tangentially with respect to the direction of conveyance.

15 Claims, 4 Drawing Sheets

(51) Int. Cl.
*A21C 7/04* (2006.01)
*A21C 3/10* (2006.01)
*A21C 11/00* (2006.01)

(58) Field of Classification Search
USPC .................................................. 425/320, 391
See application file for complete search history.

(56) References Cited

U.S. PATENT DOCUMENTS

| | | | | |
|---|---|---|---|---|
| 1,796,922 A * | 3/1931 | Eseman | ................... | A21C 7/01 425/173 |
| 1,805,018 A * | 5/1931 | Scruggs | ................... | A21C 7/01 425/320 |
| 2,450,033 A * | 9/1948 | Cohen | ...................... | A21C 3/06 118/15 |
| 2,677,334 A * | 5/1954 | Hansen | ................... | A21C 7/01 425/322 |
| 2,691,351 A | 10/1954 | Turner | | |
| 3,167,032 A * | 1/1965 | Rhodes | .................... | A21C 3/00 118/708 |
| 5,142,956 A * | 9/1992 | Ueno | ........................ | A21C 3/06 198/379 |
| 5,348,751 A * | 9/1994 | Packer | ..................... | A21C 3/06 426/297 |
| 6,838,105 B2 * | 1/2005 | Finkowski | ............. | A21C 9/063 425/320 |
| 7,156,642 B2 * | 1/2007 | Anderson | ................ | A21C 3/06 425/297 |
| 7,931,923 B2 * | 4/2011 | Hayashi | .................. | A23L 7/104 426/18 |
| 8,388,334 B2 * | 3/2013 | Van Blokland | ........ | A21C 9/063 425/320 |
| 2004/0076725 A1 | 4/2004 | Hayashi et al. | | |

FOREIGN PATENT DOCUMENTS

| | | |
|---|---|---|
| GB | 684627 A | 12/1952 |
| GB | 2468114 A | 9/2010 |

* cited by examiner

_US 10,568,332 B2_

DOUGH LINE FOR PROCESSING STICKY DOUGH TYPES

CROSS-REFERENCE TO RELATED APPLICATIONS

The present application claims priority to European Patent Application Number 16199277.1, filed on Nov. 17, 2016, and also hereby incorporated by reference

TECHNICAL FIELD

The invention relates to a dough line for processing sticky dough types, such as gluten-free dough.

BACKGROUND

The processing of sticky dough types such as gluten-free dough commonly leads to the build-up of pollution caused by dough remains sticking to surfaces interfacing with the dough. Pollution is unwanted in any circumstance, but especially in case of mass produced dough products, where pollution of the machine surfaces requires short cleaning intervals resulting in lower production yields. Sticking of the dough may be prevented by applying a strewing material between the surface and the dough. The material may be flour, or a (gluten-free) alternative such as starch, rice flour, wheat flour. This method however only works for conventional dough compositions. For the processing of sticky dough types, large quantities of strewing material are needed to prevent sticking, which quantities result in an unwanted change in the composition and/or consistency of the dough.

Dough rounding, a process suitable for producing ball-shaped dough pieces that may be baked into rounded breads or buns, is a process that especially faces the formation of pollution as it commonly involves the rolling of dough pieces on a surface or between multiple surfaces.

SUMMARY

It is therefore a goal of this invention to provide for a dough line for producing dough pieces, especially made from sticky dough types, that may consecutively be baked into rounded breads or buns, thereby avoiding or reducing pollution of machine surfaces while retaining dough consistency and/or composition.

BRIEF DESCRIPTION OF DRAWINGS

In order to further elucidate the invention, exemplary, non-limitative embodiments will be described with reference to the figures. In the figures.

DETAILED DESCRIPTION

Figure 1:
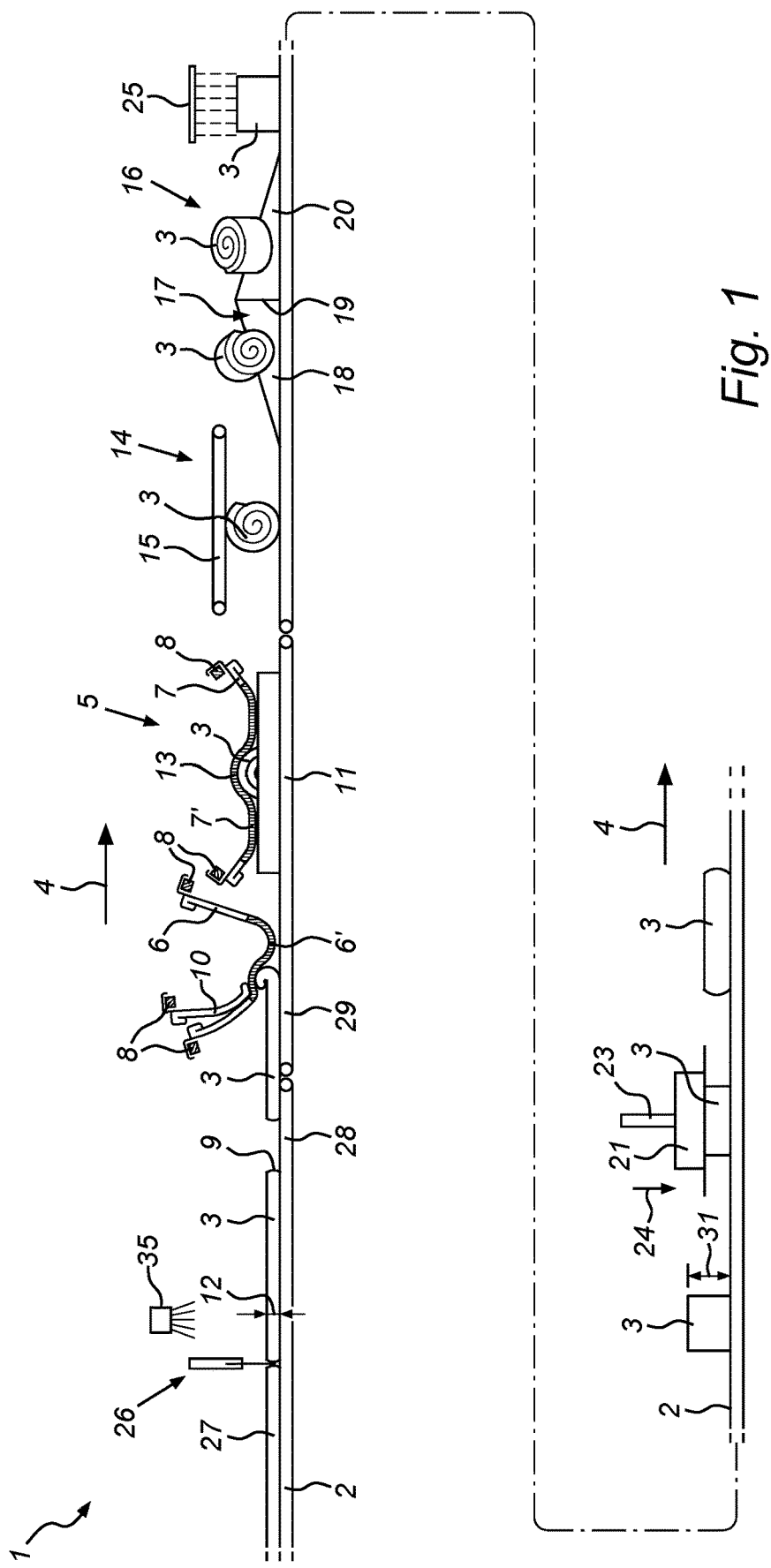
FIG. 1 shows a side view of a dough line according to the invention.

The invention thereto proposes a dough line for processing sticky dough types, comprising: at least one conveyor for transporting elongated dough pieces in a direction of conveyance, curl-up means, arranged above the conveyor, for curling up a dough piece conveyed underneath the curl-up means into a cylindrical shape, and a moulding unit for moulding the curled up dough piece thereby compressing the dough piece in an axial direction, wherein the curl-up means comprise a first and a second contact surface extending in the direction of conveyance, wherein: the first contact surface is configured for exerting a force onto a leading edge of the dough piece with at least a component in a direction opposite to the direction of conveyance and subsequently curling up the dough piece over a part of its length, and the second contact surface is configured for engaging the dough piece at an outer lateral surface of the part already curled up by the first contact surface substantially tangentially with respect to the direction of conveyance. A contact surface is herein understood as a surface of the curl-up means that contacts the dough pieces conveyed underneath the curl-up means.

The dough line may in particular be a dough line according to the sheeting principle, wherein instead of by a low stress sheeter, the dough sheet is generated by means of an extruder, in particular an extruder with 3 or 5 rollers, of which one is provided with rims, a profile and/or other grip-increasing means.

The curl-up means are able to transform elongated dough pieces into a cylinder form that closer resembles the shape of the end product, in this case a rounded bread or bun. The moulding unit subsequently deforms the cylindrical shaped dough piece, preferably such that it adheres to the shape of the mould, by letting a mould exert an axial compression force on the dough piece. During deformation, residual stresses are introduced into the dough piece that will be reduced or relieved as a whole during a subsequent baking step. Baking causes the dough piece to rise at a certain location to an extend proportional to the residual stresses present at said location, given that the dough piece is able to rise unbounded during the baking process. The moulding unit thus directly influences the shape taken by the final product after the baking process. Together, the curl-up means and the moulding unit arranged in succession obviate the need for conventional rounding machines wherein extensive contact of the dough with one or more rolling surfaces takes place. Due to the reduced contact with dough surfaces the dough line according to the invention enables the processing of dough pieces without significantly polluting the dough interfacing surfaces, such that it becomes possible to extend the period between consecutive cleaning operations, reducing production down times. In addition, the method does not necessitate the need to use large quantities of strewing material to prevent sticking of the dough piece to the dough interfacing surfaces.

By using two separate contact surfaces, a two-stage curl-up process is achieved wherein the dough piece is first curled up by the first contact surface over a part of its length and consecutively curl-up further by the second contact surface. The first contact surface exerts a force onto a leading edge or flank of the dough piece, which force has a component in a direction opposite to the direction of conveyance.

This force causes the leading edge or flank of the dough piece to be peeled off the conveyor, after which the dough slide starts to curl up. The leading edge of the dough piece is herein understood as the foremost (downstream) edge of the dough piece as seen from the direction of conveyance. However, as said component of the force opposes the motion of the conveyed dough piece, the dough piece experiences an increased rolling resistance during consecutive curling up process. The second contact surface on the other hand is configured for engaging the dough piece substantially tangentially with respect to the direction of conveyance. Hence, the dough piece experiences less resistance while curling up under the second contact surface, which further decrease pollution build-up, and more importantly, in particular in the case of gluten free dough, reduces the chance that the dough piece is torn apart due to friction. The two-stage curl-up process thus achieves an effective initiation of the curling up of the dough piece by means of the first contact surface, while reducing the additional friction caused by the first contact surface by employing a second contact surface for the further curling up of the dough piece.

In a preferred embodiment, an upstream end of the first contact surface is arranged at a right or near right angle with the conveyor surface to first contact the leading edge of the dough piece. Specifically, the first curl up means may be formed by a mat that is arranged to hang down from a support, such as a frame, arranged above the conveyor surface, wherein the mat defines a contact surface having an upstream end that encloses a near right angle with the conveyor surface. Hereby, the mat grips with the upstream end of the contact surface the leading edge of a dough piece conveyed on the conveyor surface, rather than an upper surface of the dough piece. This ensures a proper peeling of the leading edge and downstream end of the dough piece off the conveyor surface.

In a further embodiment, the second contact surface is supported by a supporting structure at a distance above the conveyor. This distance is preferably larger than the thickness of the dough piece such that the second contact surface stays clear of the uncurled part of the dough piece. In this way, no sliding friction occurs due to the second contact surface and the yet uncurled part of the dough piece sliding against each other. This takes away another possible cause for the formation of pollution and further prevents that the dough piece is torn apart. The supporting structure may comprise suspension means such as cables or chains for suspending the second contact surface above the conveyor surface. Alternatively, the supporting structure may comprise a raised support in the form of one or more beams or girders on which the second contact surface is supported.

In yet a further embodiment of the dough line according to the invention, the length over which the second contact surface extends in a direction of conveyance exceeds the length over which the first contact surface extends in a direction of conveyance. Preferably, the first contact surface extends in a direction of conveyance over such a length that it is just able to turn over the leading edge of the dough piece. The second contact surface then extends in a direction of conveyance over a length sufficient to entirely curl-up the dough piece. Contact of the dough piece with the first contact surface, which necessarily creates an added friction compared to the second contact surface as a force needs to be exerted on the leading edge of the dough piece in a direction opposing the direction of conveyance to peel it off the conveyor surface, is thus minimized.

The length over which the first contact surface extends in the direction of conveyance may specifically be the length for causing 1.5 to 2 turns of the dough, and for instance lie between 10 and 15 cm. It is found that this length enables the first contact surface to grip the leading edge of the dough piece and turn it over far enough to create an initial winding that can be engaged by the second contact surface while at the same time keeping the surface area that contacts the dough piece to a minimum.

The contact surfaces may be formed by at least one essentially flat, flexible part, such as (part of) a mat or a plate. The flexibility of the contact surfaces allows the contact surfaces to partly move with the dough piece conveyed underneath, thereby closely adhering to the changing dimensions of the dough piece during the curl-up process. The essentially flat, flexible part may be provided with means for increasing its friction on the dough slice, and be made of a food grade material having friction as an inherent property, and be provided with projections, such as ridges. The food grade material may be a plastics material.

In another embodiment of the dough line according to the invention, the dough line comprises flipping means for flipping over a curled up dough piece to an upright position prior to moulding, wherein the cylinder axis of the dough piece is oriented substantially perpendicular to a conveyor surface. This flipping of the dough piece allows the moulding unit to exert vertical force perpendicular to the conveyor surface for compressing the dough piece in an axial direction. The already present conveyor hereby exerts the necessary counterforce on the dough piece. Moreover, by flipping the cylindrical dough piece on one of its end faces, the dough piece is placed in the preferred position for undergoing the baking process. The flipping means may comprise a conveyor surface slanted in a direction perpendicular to the direction of conveyance, having a maximum inclination large enough for flipping over the dough piece. To allow for an effective flipping of the dough pieces and arresting the dough pieces once flipped onto one of their end faces, the slanted conveyor surface seen in the direction of conveyance may have a continuously increasing inclination up to a singular point of maximum inclination, followed by a continuously decreasing inclination.

To further compact the curl-up dough pieces and obtain a uniform intermediate product, the dough line comprises pressing means, for pressing the curled up dough pieces against the conveyor. These pressing means are preferably placed in between the curl-up means and the moulding unit.

The moulding unit may comprise a cylindrical shaped mould with an open end face. Preferably the mould has a height smaller than the height of the cylindrical dough piece to be moulded and a diameter larger than the diameter of the cylindrical dough piece to be moulded. Due to the specific shape of the mould, any dough piece present underneath the mould is compressed in an axial direction upon the application of a pressure on the mould. The dough piece will hereby expand in a radial direction. It has been found that allowing the dough piece to expand in a radial direction will decrease the build-up of residual stresses introduced by the moulding process in an outward radial direction of the dough piece. This allows for the creation a residual stress distribution that will lead the dough piece to take a rounded shape during the baking process. More specifically the diameter-to-height ratio of the mould may be chosen such that the dough piece is able to expand in the radial direction to substantially the same extend as to which it is compressed in the axial direction. During experiments, it has appeared that this specific ratio of compression in axial direction and expansion in radial direction leads to a final shape of the dough piece that is best suited for being baked into a perfectly rounded bread.

Due to contact of the mould with the dough piece during moulding, the mould may be sensitive to the formation of pollution in the form of dough remains. The dough line therefore may comprise a strewing material sifter for sifting strewing material onto the curled up dough piece prior to moulding, to prevent sticking of the dough to any of the dough interfacing surfaces of the mould.

In yet another embodiment of the dough line according to the invention the conveyor is configured to separate consecutively conveyed dough pieces by temporarily increasing the speed of conveyance upstream or underneath the first contact surface of the curl-up means. In a common sheeting process, an endless dough piece is rolled out into a consistent dough sheet with an even thickness and cut into even elongated dough pieces by suitable cutting means such as a guillotine. After cutting, the individual elongated dough pieces need to be separated by a certain distance in the direction of conveyance to ensure proper functioning of the curl-up means. The necessary separation between consecutive dough pieces is effectively accomplished by temporarily conveying the leading dough piece at a higher speed than the trailing dough piece, for example by using multiple adjoining conveyor sections wherein a downstream conveyor section is set to a higher speed of conveyance than a neighbouring upstream conveyor section.

In an alternative embodiment, the conveyor may be configured for conveying a plurality of parallel dough pieces for parallel processing. Parallel processing effectively increases the output of the dough line.

FIG. 1 shows a side view of a dough line 1 according to the invention, comprising a conveyor 2 for transporting elongated dough pieces 3 in a direction of conveyance 4. Curl-up means 5 are arranged above the conveyor surface and comprise a first and a second contact surface 6', 7' suspended by a frame 8 and extending in the direction of conveyance 4. The depicted first and second contact surfaces 6', 7' are formed by a first and a second flexible mat 6, 7. It is however equally possible that the first and second contact surfaces 6', 7' are part of a single flexible mat or comparative flat, flexible part. To be able to exert a force onto a leading edge 9 of the dough piece 3 which at least a component in a direction opposite to the direction of conveyance 4, the first contact surface 6' is weighted down with a chain 10 placed onto the flexible mat 6. The weight of the chain 10 causes the upstream end of the mat 6 to hang down from the frame 8 at a near right angle to the conveyor surface. The downstream end of the first contact surface 6' acts to subsequently curl up the dough piece 3 over a part of its length. The second contact surface 7' is supported by a girder 11 at a distance above the conveyor surface, which distance exceeds the thickness 12 of the dough piece 3. The second contact surface 7' engages the dough piece 3 at an outer lateral surface 13 of the part already curled up by the first contact surface 6' substantially tangentially with respect to the direction of conveyance 4.

Pressing means 14 are provided downstream the curl-up means 5, comprising a pressing conveyor 15 arranged above and parallel to the conveyor 2. As an alternative, a pressing plate may be present. These serve for fixation of the curled up dough piece, and for removing the seam that resulted from the curling step. The distance between the pressing conveyor 15 and the conveyor 2 may be adjusted dependent on the preferred diameter of the dough pieces 3 after passing the pressing means 14. This diameter is dependent on the desirable degree of compacting of the curled up dough pieces 3 going into downstream dough processing stages.

Flipping means 16 are provided downstream the curl-up means 5 and the pressing means. The flipping means 16 comprise a conveyor surface 17 slanted in a direction perpendicular to the direction of conveyance 4. The slanted conveyor surface 17 as seen in the direction of conveyance 4 comprises a first stretch 18 with a continuously increasing inclination up to a singular point of maximum inclination 19, followed by a second stretch 20 with continuously decreasing inclination from the singular point of maximum inclination 19. The maximum inclination is hereby large enough for flipping over the dough piece 3. In a further embodiment, a wing conveyor may be applied, for flipping multiple lanes of dough products in parallel.

Downstream the flipping means 16 a moulding unit is provided. The moulding unit 20 comprises one or more cylindrical moulds 21, having an open end face 22 facing the conveyor 2. The moulding unit further comprises means 23 for applying a pressure on the mould in a direction towards the conveyor, upon which a dough piece 3 present underneath the mould 21 is compressed in an axial direction 24. A strewing material sifter 25 is provided downstream the flipping means 16 to provide the curled up dough pieces 3 with strewing material prior to moulding to prevent sticking of the dough pieces 3 to the mould 21.

Cutting means 26 are provided upstream the curl-up means 5 for cutting an endless dough piece 27 in consecutive elongated dough pieces 3. The cutting means are followed by a water sprinkler 35. The water sprinkler fixates the dough product and in particular dissolves the sprinkling material. The conveyor downstream the cutting means and upstream or underneath the first contact surface of the curl-up means comprises multiple adjoining conveyor sections 28, 29 wherein an downstream conveyor section 29 is set to a higher speed of conveyance than a neighbouring upstream conveyor section 28 to separate the elongated dough pieces 3.

Figure 2:
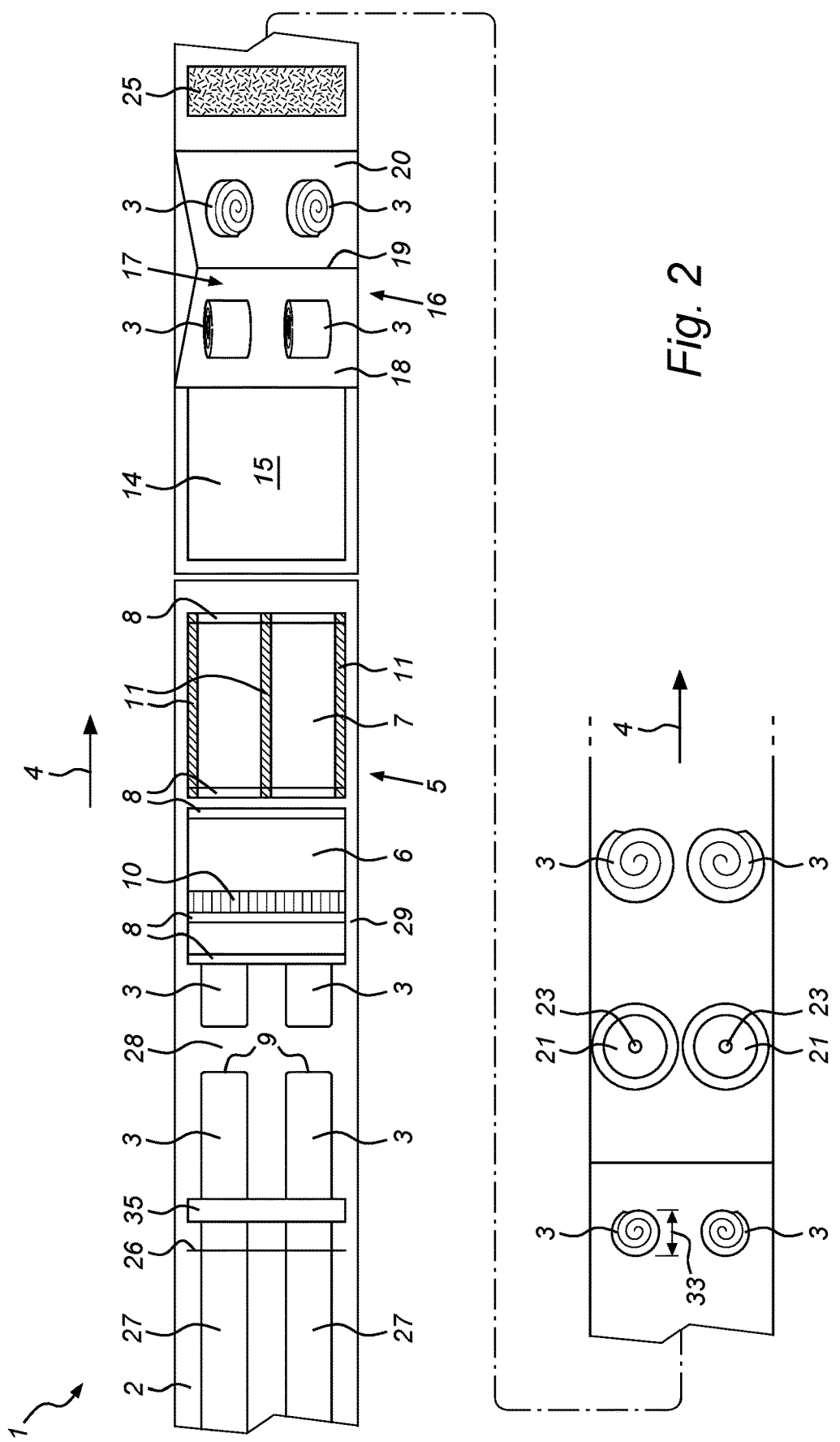
FIG. 2 shows a top view of a dough line according to the invention.

FIG. 2 shows a top view of a dough line 1 according to the invention, wherein similar reference numbers refer to similar elements as the ones discussed above. The width of the conveyor provides space for a plurality of parallel dough pieces 3 that are processed in parallel at each of the processing stations.

Figure 3:
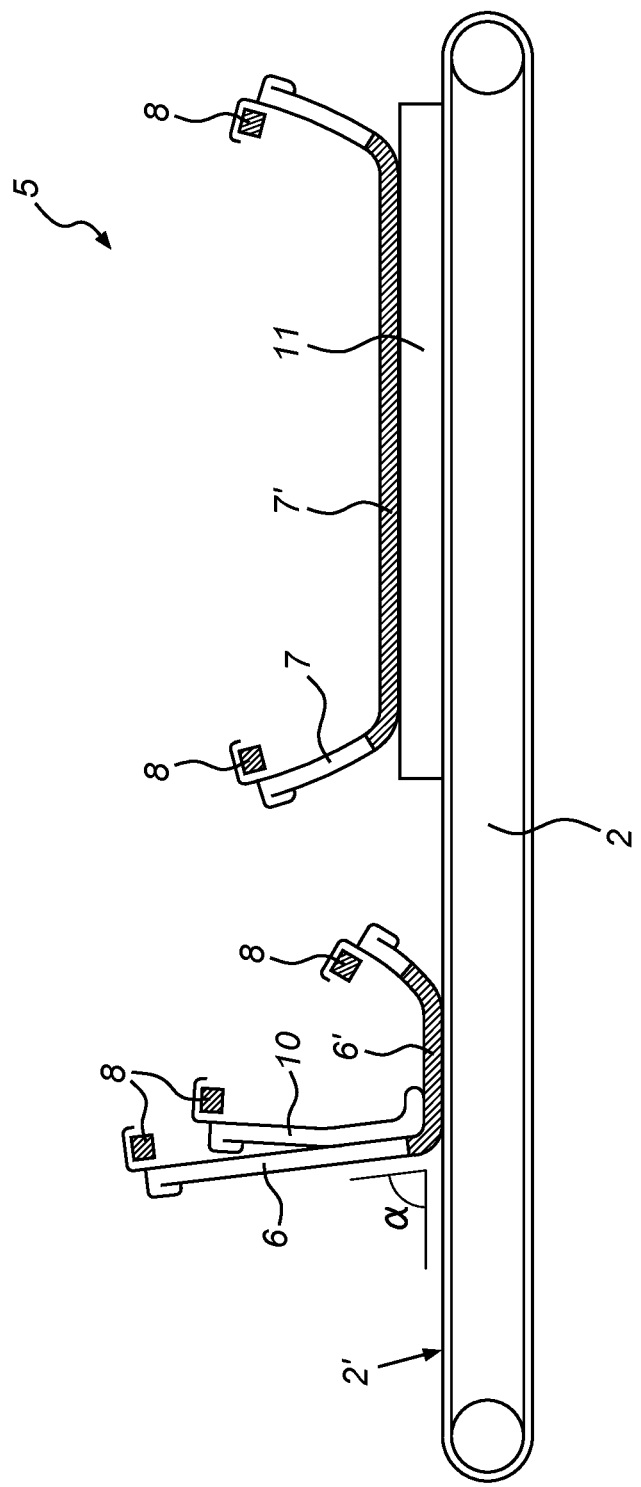
FIG. 3 shows a detailed side view of curl-up means for use in dough line according to the invention.

FIG. 3 shows a detailed side view of curl-up means 5 for use in dough line according to the invention, wherein similar reference numbers again refer to similar elements. The first contact surface 6' is here formed by part of a mat 6 that is arranged to hang down from a frame 8 arranged above the conveyor surface 2'. An upstream end of the mat 6 and the conveyor surface 2' hereby enclose an angle α, where α lies between 45° and 90°, preferably between 75° and 90. A chain 10 is placed onto the flexible mat 6 to weigh down the mat such that it hangs down from the frame 8 at an angle α. Moreover, the weight of the chain 10 provides for an increased counterforce at the moment the leading edge 9 of a dough piece 3 contacts the upstream end of the mat 6.

Figure 4:
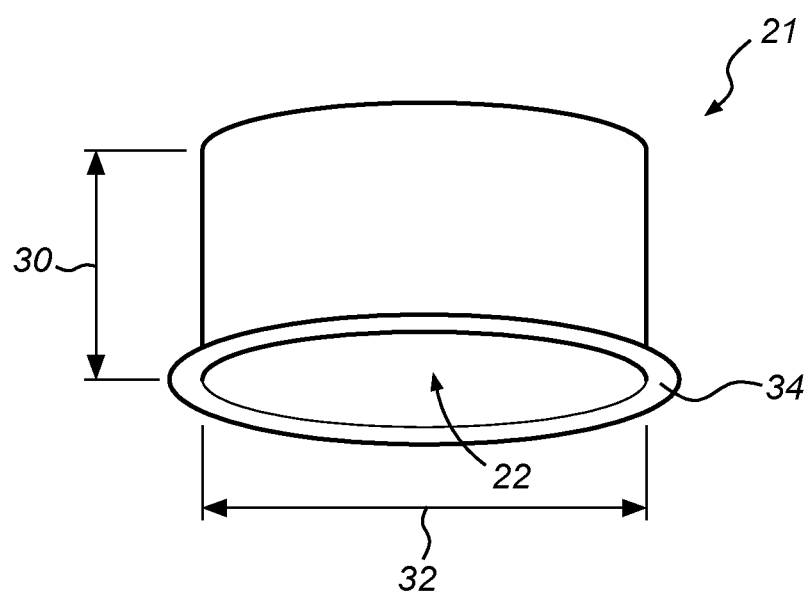
FIG. 4 shows a perspective view of a mould for use in dough line according to the invention.

FIG. 4 shows a perspective view of a cylindrical mould 21 having an open end face 22 for use in dough line 1 according to the invention. The mould 21 has a height 30 smaller than the height 31 of the cylindrical dough piece 3 to be moulded and a diameter 32 larger than the diameter 33 of the cylindrical dough piece 3 to be moulded. The mould 21 is provided with an optional flange 34 at the circumference of the open end face 22 to further strengthen the mould 21. The mould may be provided with a non-stick coating.

What is claimed is:
1. A dough line, comprising:
   at least one conveyor for transporting elongated dough pieces on a conveyor surface of the at least one conveyor in a direction of conveyance;
   curl-up means, arranged above the conveyor, for curling up a dough piece conveyed underneath the curl-up means into a cylindrical shape;
   a moulding unit for moulding the curled up dough piece thereby compressing the dough piece in a direction that is axial to the direction of conveyance, wherein the curl-up means comprise a first and a second contact surface extending in the direction of conveyance, wherein:
   the first contact surface is configured for exerting a force onto a leading edge of the dough piece with at least a component in a direction opposite to the direction of conveyance and subsequently curling up the dough piece over a part of its length, and
   the second contact surface is configured for engaging the dough piece at an outer lateral surface of the part already curled up by the first contact surface substantially tangentially with respect to the direction of conveyance and;
flipping means for flipping over a curled up dough piece to an upright position prior to moulding, wherein the flipping means comprise at least one conveyor surface slanted in a direction perpendicular to the direction of conveyance and inclined with respect to the conveyor surface of the at least one conveyor, the slanted conveyor surface of the flipping means having a maximum inclination with respect to the conveyor surface of the at least one conveyor large enough for flipping over the dough piece.

2. The dough line according to claim 1, wherein an upstream end of the first contact surface is arranged at a right or substantially right angle with the conveyor surface of the at least one conveyor to first contact the leading edge of the dough piece.

3. The dough line according to claim 1 wherein the second contact surface is supported by a supporting structure at a distance above the conveyor.

4. The dough line according to claim 1, wherein the length over which the second contact surface extends in the direction of conveyance exceeds the length over which the first contact surface extends in the direction of conveyance.

5. The dough line according to claim 1, wherein the length over which the first contact surface extends in the direction of conveyance lies between 10 and 15 cm.

6. The dough line according to claim 1, wherein the contact surfaces are formed by at least one essentially flat, flexible part.

7. The dough line according to claim 1, wherein the cylindrically shaped dough piece has a cylinder axis and the flipping means flips over the curled up dough piece to an upright position prior to moulding so that the cylinder axis of the dough piece is oriented substantially perpendicular to the conveyor surface of the at least one conveyor.

8. The dough line according to claim 1, wherein the at least one slanted conveyor surface of the flipping means seen in the direction of conveyance has a continuously increasing inclination with respect to the conveyor surface of the at least one conveyor up to a singular point of maximum inclination, followed by a continuously decreasing inclination with respect to the conveyor surface of the at least one conveyor.

9. The dough line according to claim 1, wherein the dough line comprises pressing means downstream from the curl-up means and upstream from the flipping means, for pressing the curled up dough piece against the conveyor.

10. The dough line according to claim 1, wherein the moulding unit comprises a cylindrical shaped mould with an open end face.

11. The dough line according to claim 1, wherein the dough line comprises a strewing material sifter for sifting strewing material onto the curled up dough piece prior to moulding.

12. The dough line according to claim 1, wherein the conveyor is configured to separate consecutively conveyed dough pieces by temporarily increasing the speed of conveyance downstream or underneath the first contact surface of the curl-up means.

13. The dough line according to claim 1, wherein the conveyor is configured for conveying a plurality of parallel dough pieces for parallel processing.

14. The dough line of claim 6 wherein the contact surfaces are formed by a mat.

15. The dough line of claim 6 wherein the contact surfaces are formed by a plate.

* * * * *